United States Patent [19]
Jones

[11] Patent Number: 5,910,266
[45] Date of Patent: Jun. 8, 1999

[54] HELICAL ELECTRICAL HEATER

[75] Inventor: Darryl W. Jones, Akron, Ohio

[73] Assignee: The B.F. Goodrich Company, Richfield, Ohio

[21] Appl. No.: 08/864,090

[22] Filed: May 28, 1997

[51] Int. Cl.$^6$ .............................. H05B 3/34; H05B 3/58; H05B 3/00; H01C 3/16
[52] U.S. Cl. .................. 219/528; 219/535; 219/549; 29/611; 338/298; 338/282
[58] Field of Search ................................ 219/528, 535, 219/544, 549; 29/611, 854, 855; 338/279, 280, 281, 282, 283, 296, 298

[56] References Cited

U.S. PATENT DOCUMENTS

| | | | |
|---|---|---|---|
| 3,454,747 | 7/1969 | Hart | 219/535 |
| 3,757,086 | 9/1973 | Indoe | 219/528 |
| 4,441,017 | 4/1984 | Sorlien | 219/528 |
| 4,547,655 | 10/1985 | Kurata et al. | 219/535 |
| 4,792,663 | 12/1988 | Kishimoto | 219/549 |
| 5,213,750 | 5/1993 | Knapp et al. | 219/535 |
| 5,389,184 | 2/1995 | Jacaruso | 219/544 |
| 5,394,507 | 2/1995 | Okamoto | 219/535 |
| 5,521,358 | 5/1996 | Eileentropp | 219/549 |
| 5,818,012 | 10/1998 | Maniero | 219/535 |

OTHER PUBLICATIONS

Watlow Electric Heaters & Controls, St. Louis, MO., Silicone Rubber Heaters, Application Guide & Stock List, Bulletin #250, 8 pages. (date unknown).

Watlow Electric Heaters & Controls, St. Louis, MO., Heaters, Sensors & Controls, Product Brochure on Flexible Heaters, 12 pages. (date unknown).

Watlow Electric Heaters & Controls, St. Louis, MO., Product Brochure on Silicone Rubber Heaters, 3 pages. (date unknown).

Electrofilm Mfg. Co., Valencia, CA., Product Broshure on Heating Elements, 3 double–sided pages, Thomas Register. (date unkown).

*Primary Examiner*—Teresa Walberg
*Assistant Examiner*—Sam Paik
*Attorney, Agent, or Firm*—Kevin L. Leffel

[57] ABSTRACT

The invention is in the field of electrical resistance heaters, especially heaters for tubes, pipes, or flexible hose. More particularly, the invention is directed to an electrical heater formed as a strip that is permanently set in the shape of a helix. According to an aspect of the invention, an electrical heater is provided comprising a flexible electrical insulation strip bounded by a first longitudinal edge and a second longitudinal edge, wherein the flexible electrical insulation strip is permanently set as a helix such that the first longitudinal edge is adjacent to the second longitudinal edge; and, a flexible electrical heating element encapsulated within the electrical insulation strip.

20 Claims, 2 Drawing Sheets

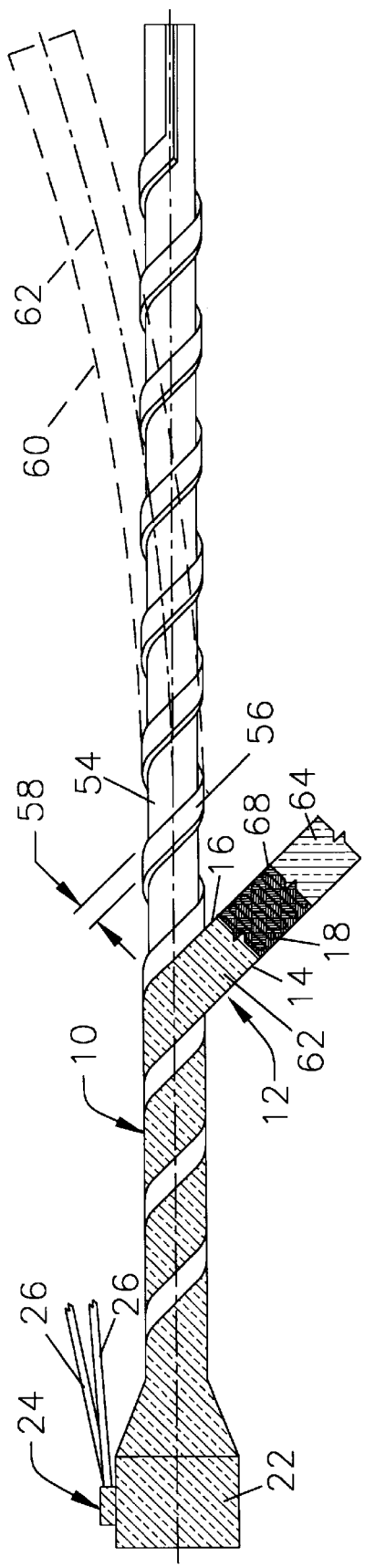
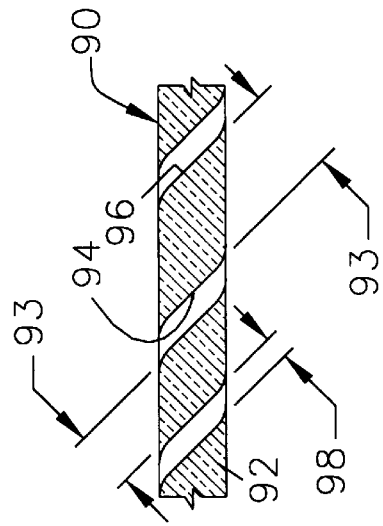
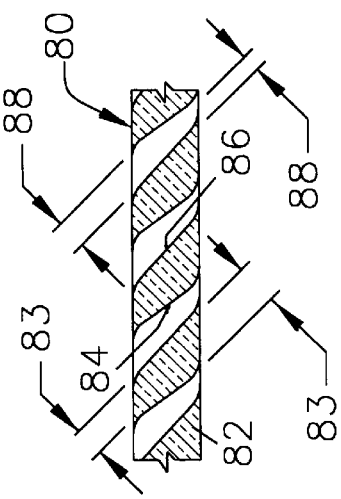
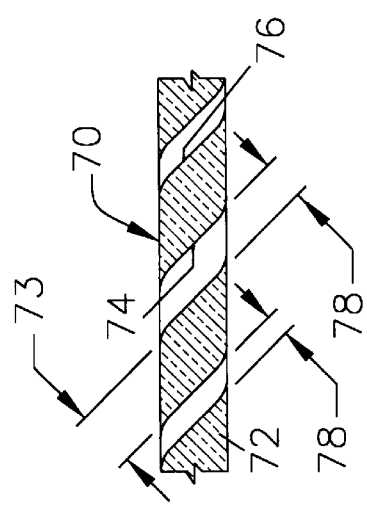

HELICAL ELECTRICAL HEATER

BACKGROUND OF THE INVENTION

The invention is in the field of electrical resistance heaters, especially heaters for tubes, pipes, or flexible hose. More particularly, the invention is directed to an electrical heater formed as a strip that is permanently set in the shape of a helix.

Electrical resistance heaters are commonly used in the art to heat conduits, such as tubes, hoses, and pipes. Such heaters typically are formed as flat strips that are wrapped around the tube or pipe to be heated. The strip comprises an electrical resistance heater, such as a wire or etched element, encapsulated in electrical insulation such as an elastomer or a suitably flexible plastic material. Silicone elastomer with or without fiberglass reinforcement is commonly used as an electrical insulation. In certain applications, the heater strip is helically wrapped around the circumference of the conduit. The heater is held in place with adhesive, or mechanical fasteners such as tie-wraps or hose clamps.

Though certainly safe and effective, these prior heaters have been found to be lacking in certain qualities. For example, applying a flat strip heater to a conduit having a curvature is difficult, which generally results in the heater poorly conforming to the conduit, especially if the curvature is complex. Air gaps often occur between the heater and the conduit, which significantly reduces efficiency of heat transfer from the heater to the conduit, and may cause local hot spots leading to premature failure. In certain applications, gaps are reduced by bonding the heater to the conduit, however, this approach renders the heater difficult to maintain and replace in the field. In addition, the final shape of an installed bendable conduit is often unknown before installation. A flat strip heater applied to a bendable conduit without bonding may develop gaps after the conduit is forced into a curvature upon installation of the conduit. Bonding the heater to a bendable conduit significantly reduces flexibility and the ability of the conduit to be conformed to a curvature. Therefore, an improved heater is desired that more readily conforms to a conduit having a curvature, especially a bendable conduit.

SUMMARY OF THE INVENTION

According to an aspect of the invention, an electrical heater for attachment to a conduit is provided, comprising:
  a flexible electrical insulation strip bounded by a first longitudinal edge and a second longitudinal edge, wherein the flexible electrical insulation strip is permanently set as a helix such that the first longitudinal edge is adjacent to the second longitudinal edge: and,
  a flexible electrical heating element encapsulated within the electrical insulation strip.

According to a further aspect of the invention, a process for making an electrical heater, comprising steps of:
  encapsulating a flexible electrical heating element within an electrical insulation strip, the electrical insulation strip being bounded by a first longitudinal edge and a second longitudinal edge; and,
  permanently setting the flexible electrical insulation strip as a helix such that the first longitudinal edge is adjacent to the second longitudinal edge.

The electrical heater according to the invention more readily conforms to a conduit having a curvature, especially a bendable conduit, without bonding the heater to the conduit. The electrical heater according to the invention closely conforms to the surface of the conduit and provides good thermal contact with the conduit without an adhesive.

DETAILED DESCRIPTION OF THE DRAWINGS

FIG. 3 is a side view of tool and process for making an electrical heater according to an aspect of the invention.

FIG. 4 is a side view of a portion of an electrical heater according to an aspect of the invention.

FIG. 5 is a side view of a portion of an electrical heater according to another aspect of the invention.

FIG. 6 is a side view of a portion of an electrical heater according to yet another aspect of the invention.

DETAILED DESCRIPTION OF THE INVENTION

Figure 1:
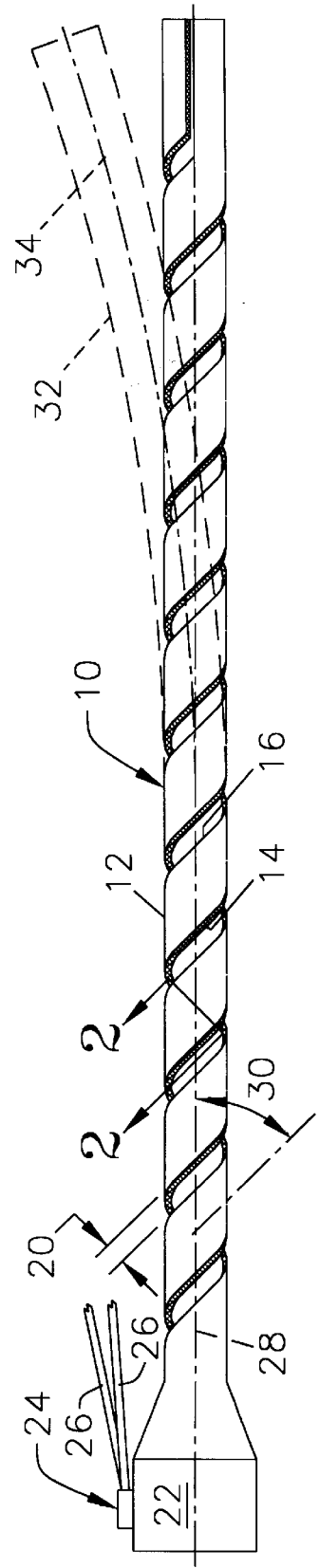
FIG. 1 is a side view of an electrical heater according to an aspect of the invention.
Figure 2:
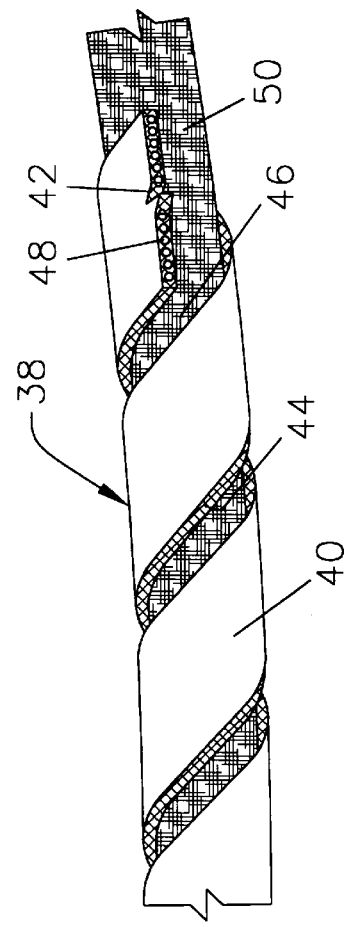
FIG. 2 is a cross-sectional view of the electrical heater of FIG. 1 along line 2—2 of that figure.

Various aspects of the invention are illustrated in FIGS. 1 thru 7, wherein like reference numbers designate like or corresponding parts throughout the several views. Referring now to FIGS. 1 and 2, an electrical heater 10 for attachment to a conduit is shown, according to an aspect of the invention. The electrical heater 10 comprises a flexible electrical insulation strip 12 bounded by a first longitudinal edge 14 and a second longitudinal edge 16. The flexible electrical insulation strip 12 is permanently set as a helix such that the first longitudinal edge 14 is adjacent to the second longitudinal edge. The helix spirals about a helix centerline 28 (shown in phantom), the helix forming a helix angle 30 relative to the helix centerline. According to a certain embodiment, the helix angle is on the order of 45 degrees. The heater 10 may be curved as indicated in phantom at 32. In such case, the helix spirals around a curved centerline 34 (shown in phantom). The heater 10 may be attached to various types of conduits, including tubes, pipes, and flexible hoses, without limitation, and is particularly useful when employed to heat conduits installed in aircraft. Typical aircraft applications include conduits installed in nontemperature controlled zones.

As best shown in FIG. 2, a flexible electrical heating element 18 is encapsulated within the electrical insulation strip 12. Various materials having suitable di-electric properties may be employed to form the electrical insulation strip 12, the materials forming the strip 12 preferably being selected from a group consisting of elastomers and thermoplastics. The electrical heating element 18 may be formed from various materials known in the art for forming electrical resistance heating elements including, but not limited to, metal wires, metal foils, conductive polymers, and conductive fibers. A metal wire or metal foil element is generally preferred. Materials and design practices for electrical resistance heating elements are very well known in the art. As used herein, the term "flexible" means that the electrical insulation strip 12 and the heating element 18 are sufficiently resilient to permit wrapping the insulation strip 12 and the heating element 18 around a conduit. As used herein, the term "permanently set" means that the insulation strip 12 holds its helical shape in a free-standing state when not installed on a conduit. In certain embodiments, thermal insulation 36 (shown in phantom) is permanently affixed to the outer surface of the flexible electrical insulation strip 12.

According to a preferred embodiment, a gap 20 having a width is provided between the first and second longitudinal edges 14 and 16 along the full length of those edges. Depending on the application, a gap may or may not be provided along the full length of the first and second longitudinal edges 14 and 16, or part of the full length of those edges. As will be discussed in more detail with respect to FIGS. 5–7, the width of the gap 20 and width of the electrical insulation strip 12 may vary.

Still referring to FIG. 1, a conduit to which the heater 10 is attached may have a fitting at one or both ends. In such case, the heater 10 may comprise an electrically heated fitting sleeve 22 at one or both ends that conforms to the shape of the fitting. The heater 10 may be provided without a fitting sleeve 22, depending on the application. An electrical power connection 24 which may comprise two or more leads 26 is attached to the heater 10, and may be conveniently attached to the fitting sleeve 22. The power connection 24 may also be attached directly to the electrical insulation strip 12. The power connection 24 is electrically connected to the electrical heating element 18 which may extend into the fitting sleeve 22, or the fitting sleeve 22 may be heated by a separate sleeve heating element electrically connected in series or parallel to the electrical heating element 18. The electrical heating element 18 may be comprised of a single heating element, or two or more sub-elements electrically connected in series or parallel. Numerous variations with respect to heating element arrangement and power connection attachment would be apparent to those skilled in the art in light of the disclosure provided herein, any of which are considered to fall within the purview of the invention.

According to a further aspect of the invention, a process is provided for making the electrical heater 10, according to a further aspect of the invention, comprising the steps of encapsulating the flexible electrical heating element 18 within the electrical insulation strip 12, the electrical insulation strip being bounded by the first longitudinal edge 14 and the second longitudinal edge 16; and, permanently setting the flexible electrical insulation strip 12 as a helix such that the first longitudinal edge 14 is adjacent to the second longitudinal edge 16. The insulation strip 12 may be permanently set in various ways, including forming the strip into the helix and heating it, which is preferred if the insulation strip 12 comprises a thermoplastic and/or a thermoset material.

Referring now to FIG. 3, a preferred process for making the electrical heater 10 is presented wherein the electrical heater 10, comprising the insulation strip 12 and heating element 18, is helically wrapped around an elongate tool 54. The tool 54 has a helical ridge 56 of uniform width 58 winding around the tool 54, and the first and second longitudinal edges 14 and 16 abutting the ridge 56. The ridge 56 winds around the tool 54 at a helix angle corresponding to the helix angle 30 (see FIG. 1) desired in the finished electrical heater 10. The insulation strip 12 preferably comprises thermoset and/or thermoplastic material, and is permanently set as a helix by heating the heater and tool 54, preferably under pressure, to a temperature sufficient to cure a thermoset material and/or to thermoform a thermoplastic material. A thermoset and/or thermoplastic elastomer is particularly preferred. A vacuum bag may be provided that envelopes the tool 54 and the heater 10, and a vacuum may be applied to the vacuum bag during heating process. The tool 54 is shown straight, but may also be curved as indicated in phantom at 60 with the helix spiraling around a curved centerline 62 also shown in phantom. As previously described in relation to FIG. 2, the process may further comprise the step of permanently affixing a flexible thermal insulation strip to the electrical insulation strip 12.

Still referring to FIG. 3, and according to a further preferred embodiment, the electrical insulation strip 12 comprises at least two coterminous strips 64 and 66 of electrical insulation, and the flexible electrical heating element 18 is encapsulated between the strips 64 and 66 of flexible electrical insulation. The element 18 may be attached to an element carrier strip 68 that provides dimensional stability to the element during assembly, and in certain embodiments the element 18 is encapsulated between two element carrier strips 68. As previously described in relation to FIG. 1, the heater 10 may comprise electrically heated fitting sleeve 22 at one or both ends that conforms to the shape of a fitting. In such case, the tool 54 may comprise a portion formed in the shape of the fitting.

In the various embodiments of the invention described thus far (FIGS. 1 and 3), the first longitudinal edge 14 is adjacent to the second longitudinal edge 16 with a gap therebetween and wherein the gap has a width that is constant along the first and second longitudinal edges, and the insulation strip 12 has a constant width. Referring now to FIGS. 4–6, various further aspects of the invention are presented wherein the width of the insulation strip is varied and/or the width of the gap is varied. Referring specifically to FIG. 4, an electrical heater 70 is provided having an insulation strip 72 of constant width 73 bounded by a first longitudinal edge 74 and a second longitudinal edge 76, wherein the first longitudinal edge 74 is adjacent to the second longitudinal edge 76 with a gap 78 therebetween and wherein the gap 78 has a width that varies along the first and second longitudinal edges 74 and 76. Referring now to FIG. 5, an electrical heater 80 is provided having an insulation strip 82 of varying width 83 bounded by a first longitudinal edge 84 and a second longitudinal edge 86, wherein the first longitudinal edge 84 is adjacent to the second longitudinal edge 86 with a gap 88 therebetween and wherein the gap 88 has a width that varies along the first and second longitudinal edges 84 and 86. In this example, the width of the insulation strip 82 and the width of the gap 88 varies such that the gap is wider along one side of the heater 80, which may provide an electrical heater that may bent to a smaller radius than a heater having an insulation strip and gap of constant widths. Referring specifically to FIG. 6, an electrical heater 90 is provided having an insulation strip 92 of varying width 93 bounded by a first longitudinal edge 94 and a second longitudinal edge 96, wherein the first longitudinal edge 94 is adjacent to the second longitudinal edge 96 with a gap 98 therebetween and wherein the gap has 98 a width that is constant along the first and second longitudinal edges 94 and 96. The heaters of FIGS. 4–6 may be made using the process previously described in relation to FIG. 3. In such case, the placement and width of the ridge 54 may be varied to provide the desired dimensions in the finished heater.

According to a certain embodiment, the heater 10 comprised a flexible electrical insulation strip 12 about one inch wide and an integral fitting sleeve 22, and the first longitudinal edge was adjacent to the second longitudinal edge with a gap 20 therebetween having a constant width on the order of one-eighth of an inch. The helix angle 30 was on the order of 45 degrees. The flexible electrical insulation strip 12 comprised first and second strips 64 and 66 formed from a thermoset silicone elastomer on the order of 0.023 inch thick, before cure, with a fiberglass scrim reinforcement, and two element carrier strips formed from a thermoset silicone elastomer on the order of 0.007 inch thick, before cure.

Thus, in this example, the electrical insulation strip 12 consisted of four layers. A suitable silicone elastomer in sheet form is available from Permacel located in New Jersey, U.S.A. The heating element 18 was a 34 gauge Tophet C providing a heat density on the order of one-half of a watt per square inch, and the fitting sleeve element was a 40 gauge core wound Nichrome 80 wire (180 ohms/foot). The elements were wound onto one of the 0.007 inch thick element carrier strips, and covered with the other element carrier strip. The element carrier strips, with the element 18, were then encapsulated between the first and second strips 64 and 66. The flexible electrical insulation strip 12 and element 18 were wrapped around a tool, vacuum bagged, and cured under heat and pressure into a permanently set helical shape, as previously described in relation to FIG. 3. The heater 10 had an inside diameter on the order of one-half an inch. Though described in relation to a specific embodiment, the various dimensions and materials may change depending on the application without departing from the invention.

Figure 7:
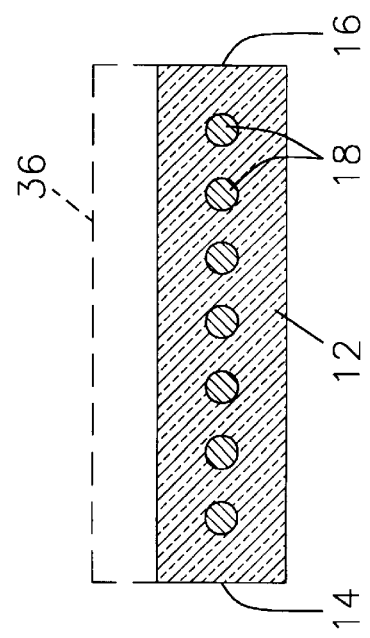
FIG. 7 is a side view of a heated assembly, according to an aspect of the invention, comprising an electrical heater and a flexible conduit.

Referring now to FIG. 7, a view of a heated assembly 38 with parts broken away is presented according to a further aspect of the invention. The heated assembly 38 comprises an electrical heater 40 and a conduit 50. The electrical heater 40 comprises a flexible electrical insulation strip 42 bounded by a first longitudinal edge 44 and a second longitudinal edge 46, wherein the flexible electrical insulation strip 42 is permanently set as a helix such that the first longitudinal edge 44 is adjacent to the second longitudinal edge 46. A flexible electrical heating element 48 is encapsulated within the electrical insulation strip 42. The conduit 50 is straight or curved and has an outer surface 52. The flexible electrical insulation strip 42 is wrapped around the outer surface 52 with the helix distributed along the outer surface 52. The Electrical heater 40 may comprise one or more further features previously described herein. In certain embodiments, the conduit 50 is bendable, meaning that the conduit 50 may be bent during installation of the conduit 50 in its end-use application, such as on an aircraft. The heater 40 is preferably held in place by mechanical fasteners such as tie-wraps or hose clamps, without an adhesive, although adhesives may be employed in some applications.

Variations are possible without departing from the true scope and spirit of the invention as defined by the following claims.

I claim:

1. An electrical heater for attachment to a conduit, comprising:
   a flexible electrical insulation strip bounded by a first longitudinal edge and a second longitudinal edge, wherein said flexible electrical insulation strip is permanently set as a helix such that said first longitudinal edge is adjacent to said second longitudinal edge; and,
   a flexible electrical heating element encapsulated within said electrical insulation strip.

2. The heater of claim 1, wherein said flexible electrical insulation is selected from a group consisting of elastomers and thermoplastics.

3. The heater of claim 1, wherein said first longitudinal edge is adjacent to said second longitudinal edge with a gap therebetween and wherein said gap has a width that is constant along said first and second longitudinal edges.

4. The heater of claim 1, wherein said first longitudinal edge is adjacent to said second longitudinal edge with a gap therebetween and wherein said gap has a width that varies along said first and second longitudinal edges.

5. The heater of claim 1, wherein thermal insulation is permanently affixed to said flexible electrical insulation strip, and permanently set with said flexible electrical insulation strip.

6. The heater of claim 1, wherein said helix spirals about a helix centerline, said helix forming a helix angle relative to said helix centerline on the order of 45 degrees.

7. The heater of claim 1, wherein said flexible electrical insulation is silicone rubber; said flexible electrical heating element is resistance wire; and, wherein said first longitudinal edge is adjacent to said second longitudinal edge with a gap therebetween and wherein said gap is on the order of one-eighth of an inch.

8. The heater of claim 1, wherein said helix spirals about a helix centerline, said centerline being curved.

9. A heated assembly, comprising:
   a flexible electrical insulation strip bounded by a first longitudinal edge and a second longitudinal edge, wherein said flexible electrical insulation strip is permanently set as a helix such that said first longitudinal edge is adjacent to said second longitudinal edge;
   a flexible electrical heating element encapsulated within said electrical insulation strip; and,
   a curved conduit having an outer surface, said flexible electrical insulation strip being wrapped around said outer surface with said helix distributed along said outer surface.

10. A heated assembly, comprising:
    a flexible electrical insulation strip bounded by a first longitudinal edge and a second longitudinal edge, wherein said flexible electrical insulation strip is permanently set as a helix such that said first longitudinal edge is adjacent to said second longitudinal edge;
    a flexible electrical heating element encapsulated within said electrical insulation strip; and,
    a curved bendable conduit having an outer surface, said flexible electrical insulation strip being wrapped around said outer surface with said helix distributed along said outer surface.

11. A process for making an electrical heater, comprising steps of:
    encapsulating a flexible electrical heating element within an electrical insulation strip, said electrical insulation strip being bounded by a first longitudinal edge and a second longitudinal edge; and,
    permanently setting said flexible electrical insulation strip as a helix such that said first longitudinal edge is adjacent to said second longitudinal edge.

12. The process of claim 11, further comprising the step of helically wrapping said flexible electrical heating element and said electrical insulation strip around an elongate tool.

13. The process of claim 11, further comprising the step of helically wrapping said flexible electrical heating element and said electrical insulation strip around an elongate tool, and wherein said tool has a helical ridge of uniform width winding around said tool, said first and second longitudinal edges abutting said ridge.

14. The process of claim 11, further comprising the step of helically wrapping said flexible electrical heating element and said electrical insulation strip around an elongate tool, and wherein said tool has a helical ridge of varying width winding around said tool, said first and second longitudinal edges abutting said ridge.

15. The heater of claim 11, wherein said helix spirals about a helix centerline, said centerline being curved.

16. The process of claim 11, further comprising the step of helically wrapping said flexible electrical heating element and said electrical insulation strip around a curved elongate tool.

17. The process of claim 11, further comprising the step of permanently affixing a flexible thermal insulation strip to said electrical insulation strip.

18. The heater of claim 11, wherein said helix spirals about a helix centerline, said helix forming a helix angle relative to said helix centerline on the order of 45 degrees.

19. A process for making an electrical heater, comprising steps of:

encapsulating a flexible electrical heating element between strips of flexible electrical insulation having a first longitudinal edge and a second longitudinal edge;

helically wrapping said flexible electrical insulation strips around an elongate cylindrical tool having a helical ridge such that said first longitudinal edge and said second longitudinal edge are adjacent to each other and abut said ridge; and, permanently setting said flexible electrical insulation strips such that they retain their shape after removal from the tool.

20. The process of claim 19, wherein said tool is curved.

* * * * *